(12) United States Patent
Fauchery et al.

(10) Patent No.: US 10,443,636 B2
(45) Date of Patent: Oct. 15, 2019

(54) CONNECTOR ASSEMBLY INCLUDING FITTING AND PARTIALLY SPHERICAL WASHERS

(71) Applicants: Florent Fauchery, Montmeyran (FR); Anthony Jerome, Lons-le-Saunier (FR); Jean-Michel Buchin, Lons-le-Saunier (FR); Florian Bardy, Lacaune (FR); Guy Valembois, Toulouse (FR)

(72) Inventors: Florent Fauchery, Montmeyran (FR); Anthony Jerome, Lons-le-Saunier (FR); Jean-Michel Buchin, Lons-le-Saunier (FR); Florian Bardy, Lacaune (FR); Guy Valembois, Toulouse (FR)

(73) Assignee: SKF Aerospace France S.A.S, Saint-Vallier (FR)

( * ) Notice: Subject to any disclaimer, the term of this patent is extended or adjusted under 35 U.S.C. 154(b) by 575 days.

(21) Appl. No.: 15/087,888

(22) Filed: Mar. 31, 2016

(65) Prior Publication Data

US 2017/0284435 A1    Oct. 5, 2017

(51) Int. Cl.
*F16B 5/02* (2006.01)
*F16B 43/00* (2006.01)
*F16B 43/02* (2006.01)

(52) U.S. Cl.
CPC ............... *F16B 5/02* (2013.01); *F16B 43/00* (2013.01); *F16B 43/02* (2013.01)

(58) Field of Classification Search
CPC ............. F16B 5/02; F16B 43/02; F16B 43/00
See application file for complete search history.

(56) References Cited

U.S. PATENT DOCUMENTS

2011/0272536 A1*  11/2011  Valembois ............ B29C 33/485
                                                                 248/200
2013/0209162 A1*  8/2013  Buchin ................. B29C 33/485
                                                                 403/205

\* cited by examiner

*Primary Examiner* — Brian Handville
(74) *Attorney, Agent, or Firm* — Mark Ussai; SKF USA Inc. Patent Dept.

(57) ABSTRACT

A connector assembly includes a generally L-shaped fitting with a first mounting portion having a mounting hole(s), a second mounting portion extending generally angled to the first mounting portion and having a mounting hole(s) and a joint portion integrally connecting the two mounting portions. The joint portion has a load section(s) defined between a concave surface section extending between inner surfaces of the first and second mounting portions and a convex surface section extending between outer surfaces of the first and second mounting portions, the load section concave surface section having a radius of curvature. A washer has an outer perimeter surface with a section having a partially spherical profile and is sized such that the spherical surface section is disposed against the joint load section concave surface so that the washer exerts force generally against the joint load section when the washer is clamped to the second mounting portion.

11 Claims, 8 Drawing Sheets

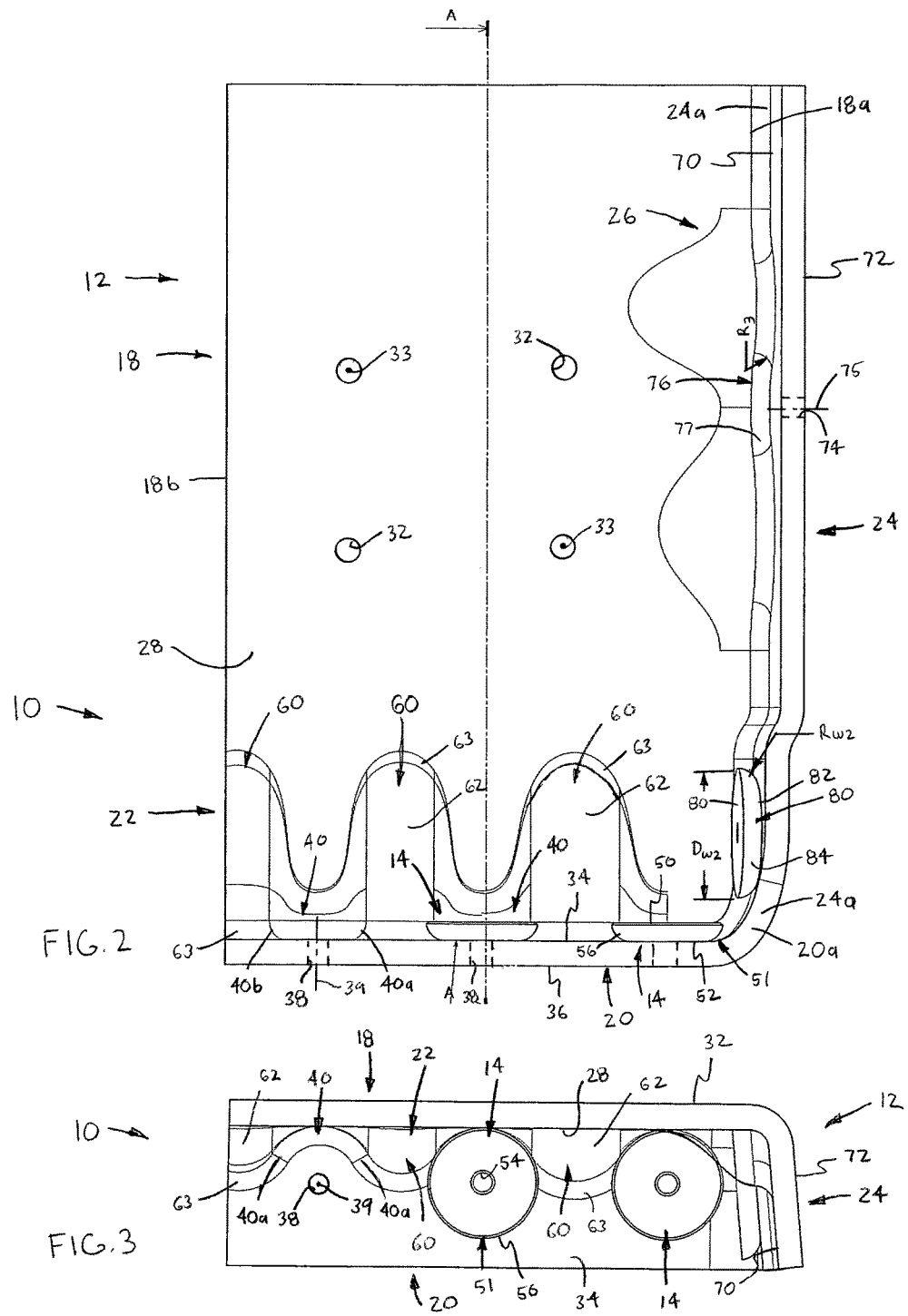

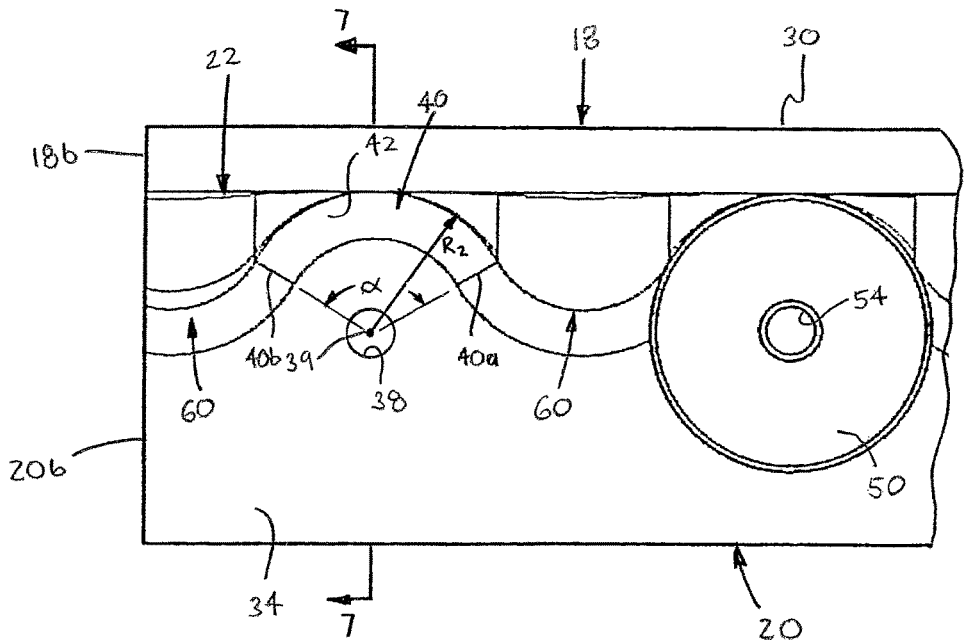
FIG. 6
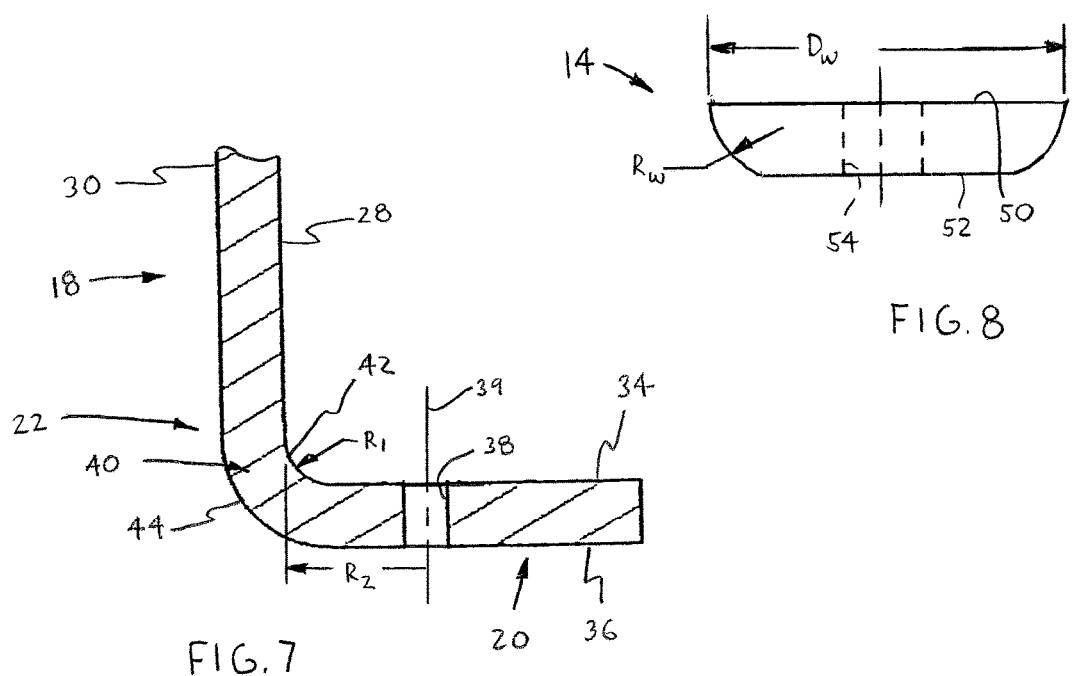
FIG. 8
FIG. 7

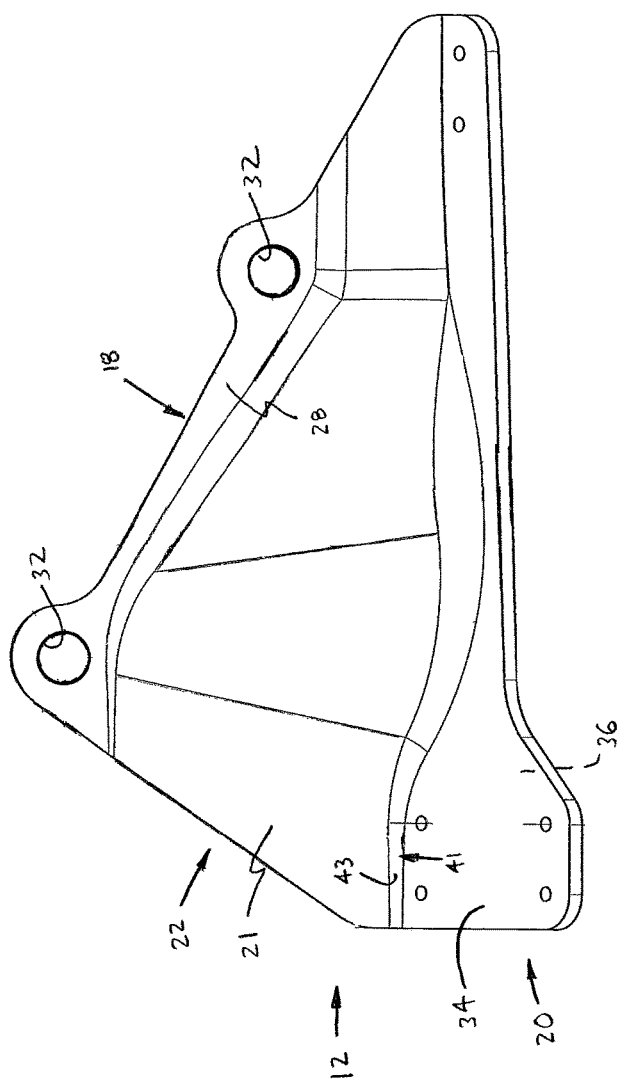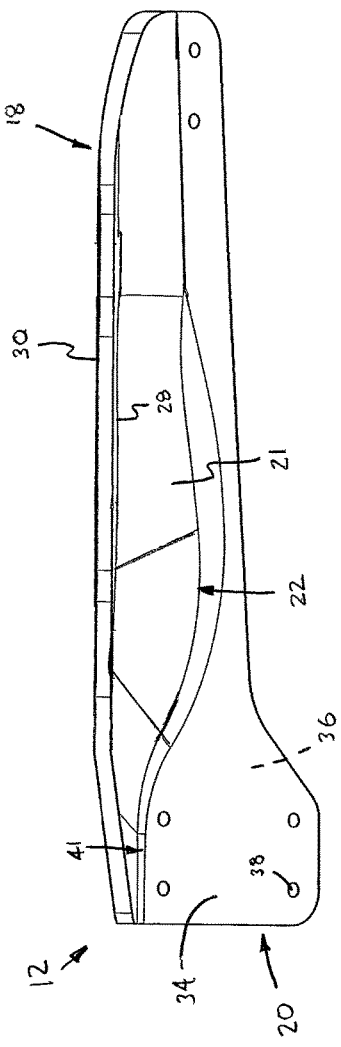

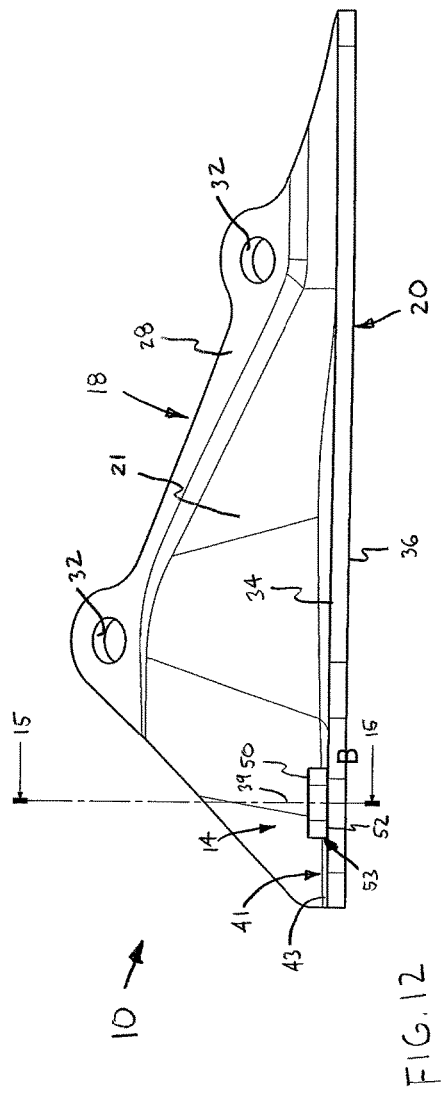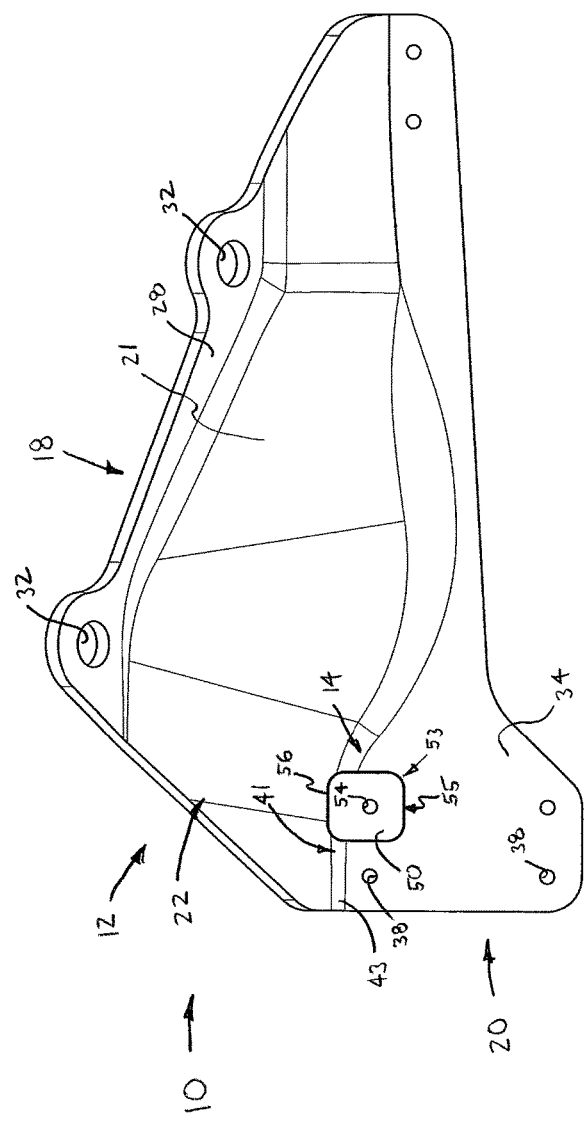

CONNECTOR ASSEMBLY INCLUDING FITTING AND PARTIALLY SPHERICAL WASHERS

BACKGROUND OF THE INVENTION

The present invention relates to connector assemblies, particularly connectors including fittings used to connect angled arranged members.

Fittings or brackets for connecting two or more members are generally known. When intended to connect to surfaces that are generally orthogonal to each other, such fittings/brackets are often generally L-shaped. In certain applications in which weight is an important consideration, such as the aircraft industry, the fittings may be made of a composite material of fibers embedded within resin. However, as such materials are typically much stronger in compression versus tension, a designer must ensure that such a fitting is not subject to tensile loading of a magnitude that causes failure of the fitting.

SUMMARY OF THE INVENTION

The present invention is an assembly for connecting at least first and second members, each member having a surface extending generally angled with respect to a surface of the other member. The connector assembly comprises a generally L-shaped fitting including a first mounting portion having generally planar inner and outer surfaces and at least one mounting hole extending between the inner and outer surfaces for connecting with the first member. A second mounting portion extends generally angled with respect to the first mounting portion and has generally planar inner and outer surfaces. At least one mounting hole extends between the inner and outer surfaces for connecting with the second member, the second portion mounting hole having a central axis. A joint portion integrally connects the first and second mounting portions, the joint portion having a load section defined between a concave surface section extending between the inner surfaces of the first and second mounting portions and a convex surface section extending between the outer surfaces of the first and second mounting portions, the load section concave surface section having a radius of curvature. At least one washer is disposable on the second mounting portion inner surface so as to be generally centered about the central axis of the second portion mounting hole. The washer has opposing first and second, generally planar faces and an outer perimeter surface having at least section with a partially spherical profile. The partially spherical surface section has a radius about equal to the first radius of the joint portion concave surface and the washer is sized such that the washer spherical surface section is disposed against the joint load section concave surface. As such, the washer exerts force generally against the joint portion load section when the washer is clamped to the second mounting portion.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2 is a front plan view of the first construction connector assembly;

FIG. 3 is a top plan view of the first construction connector assembly;

FIG. 6 is a broken-away, enlarged view of a portion of FIG. 3;

FIG. 7 is a view through line 7-7 of FIG. 6;

FIG. 8 is an enlarged side plan view of a partially spherical washer;

FIG. 10 is a front plan view of a fitting of a second construction of a connector assembly in accordance with the present invention, shown with a second mounting portion angled downwardly;

FIG. 11 is a top plan view of the fitting of the second construction connector assembly, shown with the second mounting portion angled downwardly;

FIG. 12 is another front plan view of the second construction connector assembly, shown with a first mounting portion angled rearwardly and with a washer;

FIG. 13 is another top plan view of the second construction connector assembly, shown with the first mounting portion angled rearwardly and with the washer;

DETAILED DESCRIPTION OF THE INVENTION

Figure 1:
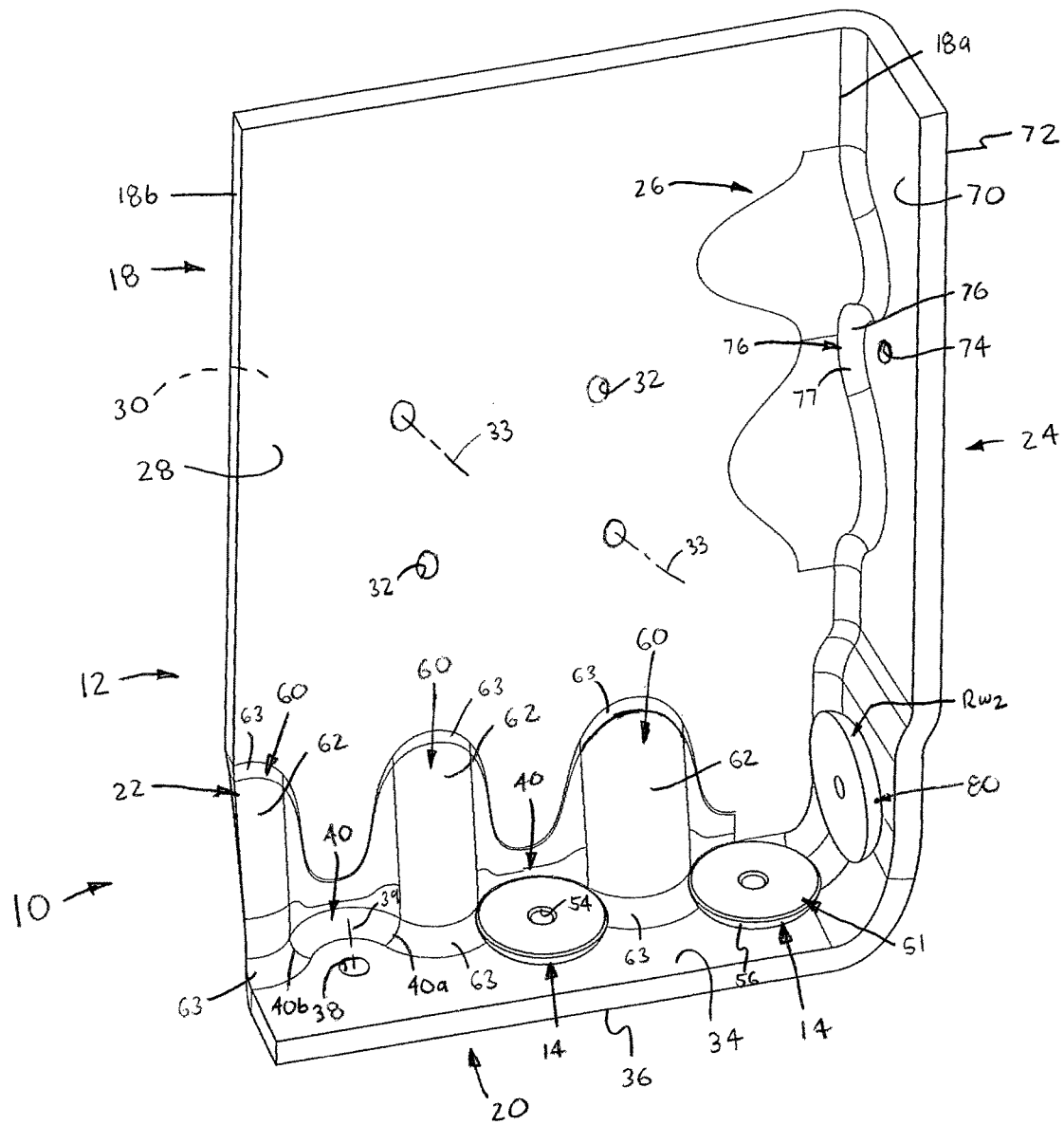
FIG. 1 is a perspective view of a first construction of a connector assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 a connector assembly 10 for connecting at least first and second members 1 and 2, or three or more members (only two depicted—FIG. 9), with each member 1, 2 having a surface 1a, 2a extending generally angled with respect to a surface 2a, 1a of the other member 2, 1, respectively. The connector assembly 10 basically comprises a fitting 12, at least one and preferably a plurality of washers 14, and at least one and preferably a plurality of fasteners 16 (FIG. 9), each fastener 16 connecting the fitting 12 with one of the members 1, 2 and clamping one washer 14 to the fitting 12, as described in detail below. The fitting 12 is preferably formed of a composite material including fibers embedded in resin, is generally L-shaped and includes first and second mounting portions 18, 20, respectively, and a joint portion 22 connecting the two mounting portions 18, 20. In certain embodiments, the fitting 10 further includes a third mounting portion 24 connected to the first mounting portion 18 by another joint 26, as described below, and may even include a fourth mounting portion (not shown).

Preferably, the first mounting portion 18 has generally planar inner and outer surfaces 28, 30, opposing side edges 18a, 18b and at least one and preferably a plurality of mounting holes 32 extending between the inner and outer surfaces for connecting with the first member 1, each mounting hole 32 having a central axis 33. The second mounting portion 20 extends generally angled with respect to the first mounting portion 18 and has generally planar inner and outer surfaces 34, 36, opposing side edges 20a, 20b and at least one mounting hole 38 extending between the inner and outer surfaces 34, 36 for connecting with the second member 2. More specifically, the second mounting portion 20 is oriented with respect to the first mounting portion 18 so as to define an angle θ (FIGS. 4 and 5) between the mounting portion inner surfaces 28, 34 that is either about ninety degrees (90°) so as to form a right angle, as shown in FIGS. 1-9, an obtuse angle as shown in FIGS. 10-14 (angle not indicated), or even an acute angle (not shown). In certain constructions, such as shown in FIGS. 1-9, the surface area of the first mounting portion 18 is substantially greater than the surface area of the second mounting portion 20 and the joint portion 22. However, the first mounting portion 18 may be formed with a lesser surface area than that of the second mounting portion 20 and/or the surface area of the joint area 22 may be greater than surface area of either or both mounting portions 18, 20, as depicted in FIGS. 10-14. Further, each second portion mounting hole 38 has a central axis 39 and each axis 39 is either generally orthogonal to, or otherwise angled with respect to, the axis 33 of each first portion mounting hole 32.

Furthermore, the joint portion 22 is configured to integrally connect the first and second mounting portions 18, 20 and has at least one and preferably a plurality of load sections 40 for transferring force from the washer(s) 14 to the fitting 12. In the first construction shown in FIGS. 1-9, each joint load section 40 is defined between a concave surface section 42 extending between the inner surfaces 28, 34 of the first and second mounting portions 18, 20, respectively, and a convex surface section 44 extending between the outer surfaces 30, 36 of the first and second mounting portions 18, 20. Referring particularly to FIGS. 6 and 7, the load section concave surface section 42 has a first, radius of curvature $R_1$ and is generally centered about the mounting hole central axis 39 of one of the second portion mounting holes 38 so as to define a second radius $R_2$. Each joint load section 40 extends partially circumferentially about the adjacent mounting hole axis 39, preferably through an angle α of at least one hundred twenty degrees (120°) about the axis 39 as indicated in FIG. 6, and terminates in opposing circumferential ends 40a, 40b.

In a second construction depicted in FIGS. 10-15, a load section 41 of the joint portion 22 is defined between a concave surface section 43 extending between the inner surface 34 of the second mounting portion 20 and an inner surface 21 of the joint portion 22 a convex surface section 45 extending between the outer surface 36 of the second mounting portion 20 and an outer surface 23 of the joint portion 22. The load section concave surface section 43 has a radius of curvature $R_1$ (FIG. 15) and the load section 41 is arranged so as to be spaced from at least one second portion mounting hole 38 and extends generally linearly (as opposed to circumferentially about as with load section 40) adjacent to at least one mounting hole 38. Further, the load section 41 may provide a surface for "loading" the fitting 12 by a single polygonal washer 53, described below, or two or more polygonal washers 53.

Figure 15:
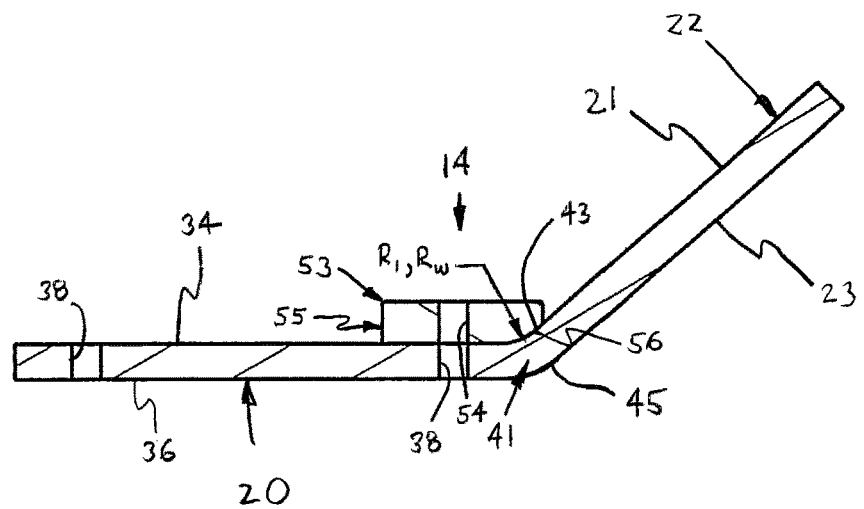
FIG. 15 is a view through line 15-15 of FIG. 12.

Further, the washers 14 each have opposing first and second, generally planar faces 50, 52, a central hole 54 extending between the faces 50, 52 and an outer perimeter surface 55 with at least a partially spherical surface section 56, as best shown in FIGS. 8 and 15. Each washer 14 is disposable on the inner surface 34 of the second mounting portion 20 so as to be generally centered about the central axis 39 of one of the second portion mounting holes 38, thereby axially aligning the washer hole 54 and mounting hole 38. Furthermore, the washer spherical surface section 56 has a radius $R_W$ (FIGS. 8 and 15) about equal to the first, radius of curvature $R_1$ of each joint portion concave surface section 42 or 43.

In certain constructions as depicted in FIGS. 1-9, the washer 14 has a generally circular body 51, with the partially spherical outer surface 56 preferably extending completely circumferentially about the body 51. The circular washer body 51 preferably has an outside diameter $D_W$ of about twice the second radius $R_2$ of the joint concave surface section 42. In other constructions as shown in FIGS. 12-15, the washer 14 has a generally polygonal body 53, preferably generally square or rectangular but may be triangular, hexagonal, etc., with at least one side 57 having a partially spherical profile that extends linearly along the entire edge 57, as best shown in FIG. 15. With a polygonal washer 14, the washer body 53 is sized such that the side 57 with the partially spherical surface/profile 56 is disposed against the load section concave surface section 43 when the washer 14 is mounted on the fitting second mounting portion 20.

Figure 9:
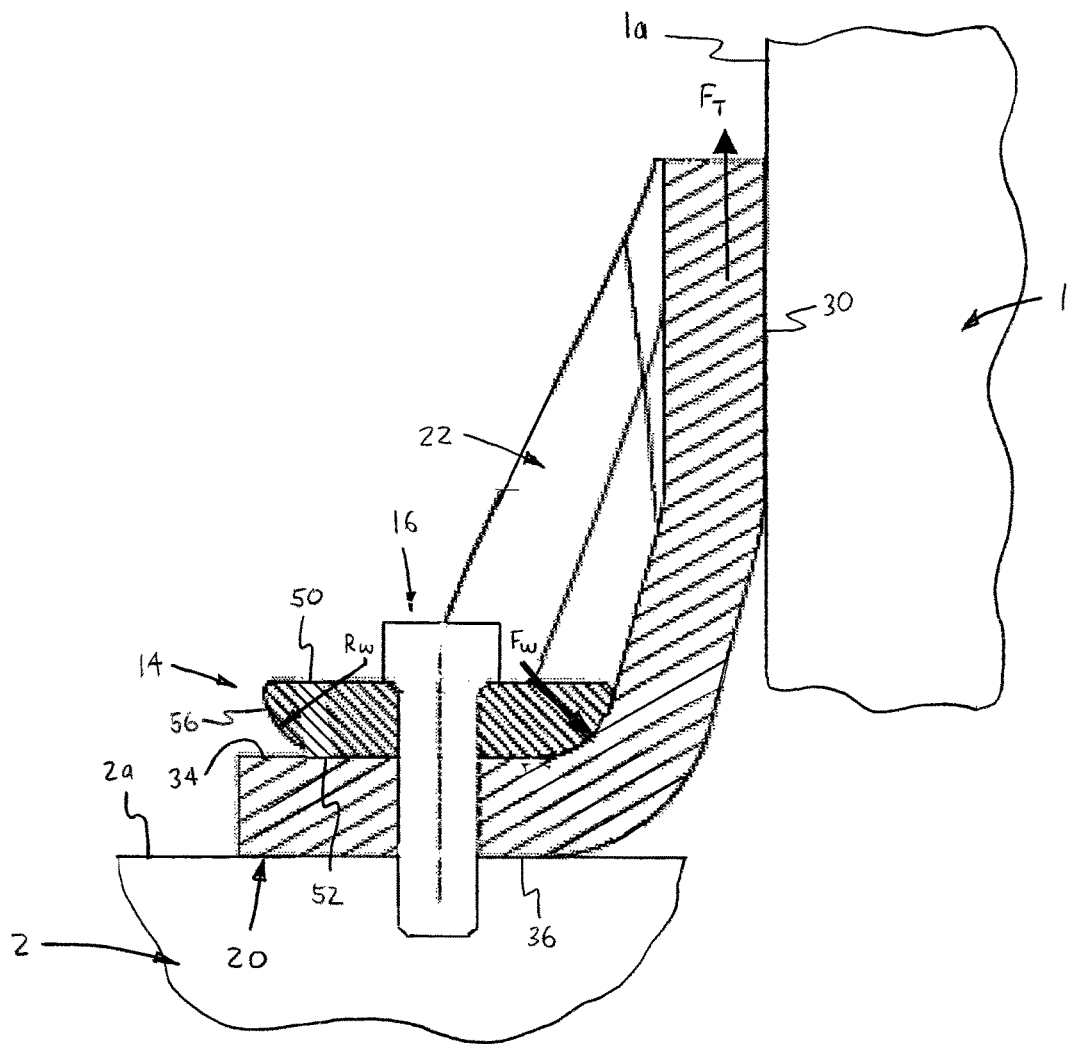
FIG. 9 is a broken-away, side cross-sectional view of the first construction connector assembly, shown with a fastener connecting the fitting with a second member.
Figure 14:
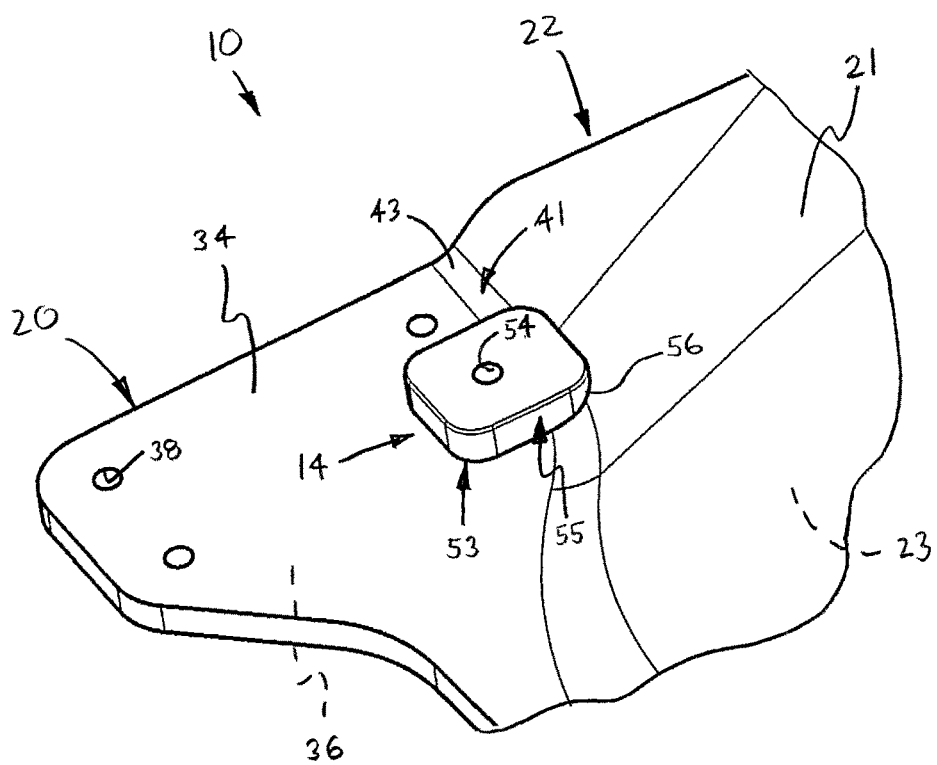
FIG. 14 is a broken-away, enlarged perspective view of the second construction connector assembly, showing the washer on the second mounting portion.

With either of the washer bodies 51, 53, the washer 14 is configured to fit closely against the adjacent joint portion load section 40 when disposed on the second mounting portion 20, such that the washer 14 exerts force $F_W$ generally against the joint portion load section 40 when the washer 14 is clamped to the second mounting portion 20. Specifically, when a fastener 16 is inserted through the washer 14 and second mounting portion hole 38 and engages with a second member 2, the fastener 16 clamps the washer 14 against the second mounting portion inner surface 34, as depicted in FIG. 9. The clamping of the washer 14 causes a portion of the washer spherical outer surface section 56 to push or press against the adjacent joint load section 40, so as to compress the local material of the fitting 12. Particularly when a tensile force $F_T$ or torque (not indicated) is applied to the fitting first mounting portion 18, as depicted in FIG. 9, the force $F_W$ is increased in reaction to the joint load section 40 pressing against the washer outer surface 56. This washer force $F_W$ compresses the resin material in the load section 40, which is particularly important for increasing the life of a fitting made of composite material, such materials typically being much stronger in compression as opposed to tension.

Figure 4:
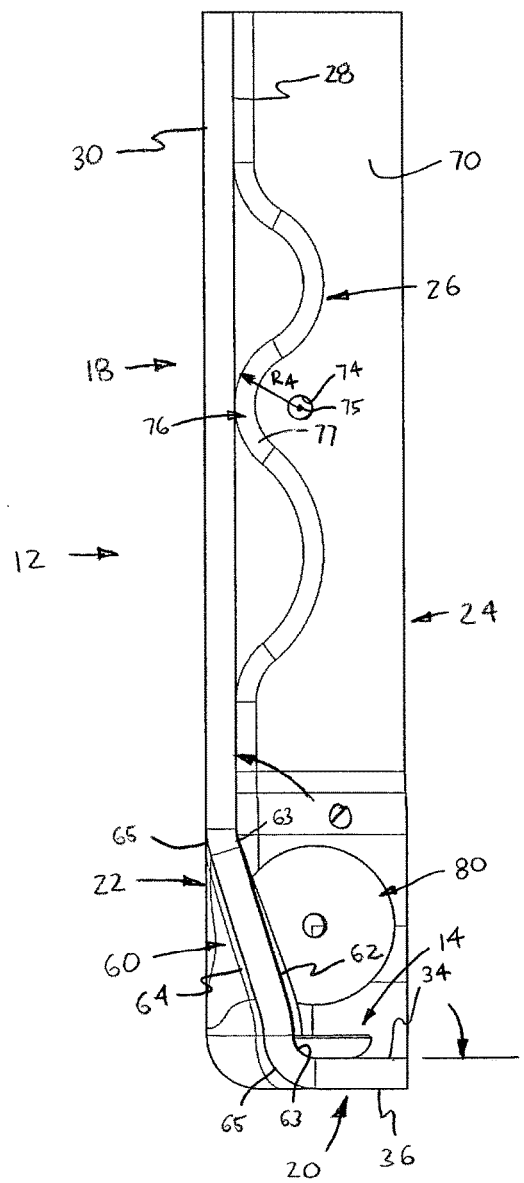
FIG. 4 is a side plan view of the first construction connector assembly.
Figure 5:
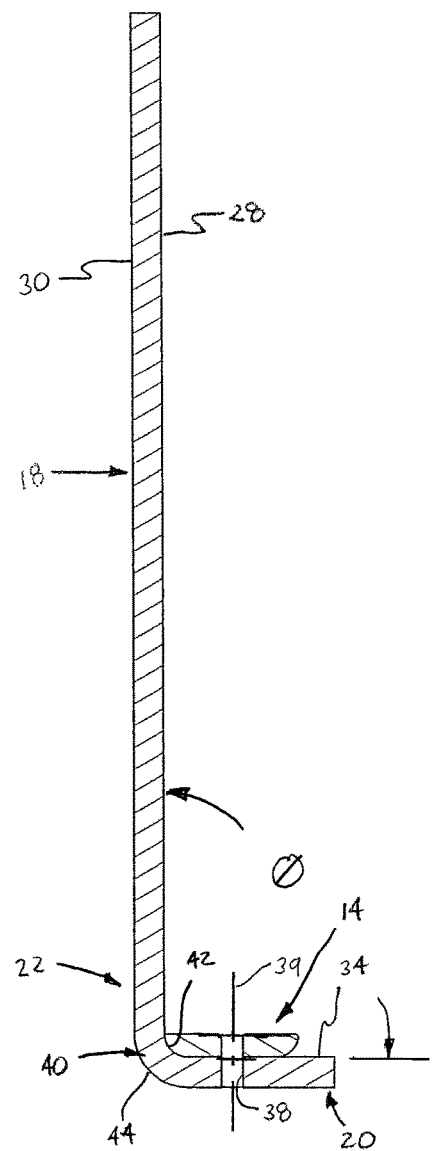
FIG. 5 is a view through line 5-5 of FIG. 2.

Referring now to FIGS. 1-4, in the first preferred construction, the fitting joint portion 22 further includes at least two curved transition sections 60 connecting at least one of the joint load section circumferential ends 40a, 40b with the first mounting portion 18. Each transition section 60 is preferably defined between a generally convex surface section 62 extending between the inner surfaces 28, 34 of the first and second mounting portions 18, 20, respectively, and a generally concave surface section 64 (FIG. 4) extending between the outer surfaces 30, 36 of the first and second mounting portions 18, 20. Preferably, the ends of each convex surface 62 are "blended" into the two inner surfaces 28, 34 by a separate concave surface section 63 and the ends of each convex surface 64 are blended into the two outer surfaces 30, 36 by a separate convex surface section 65, as indicated in FIGS. 1, 2 and 4. Further, when the second mounting portion 20 has at least two mounting holes 38, the joint portion 22 has at least two load sections 40, each extending partially about the central axis 39 of a separate one of the mounting holes 38, and at least three transition sections 60. In this case, each transition section 60 is disposed at separate circumferential end 40a, 40b of the at least two load sections 40 and one transition section 60 is disposed between the at least two mounting holes 38 and connects the circumferential ends 40a and 40b of two load sections 40 with the first mounting portion 18.

Still referring to FIGS. 1-4, in certain constructions as mentioned above, the fitting 12 further includes a third mounting portion 24 extending generally perpendicularly to each of the first and second mounting portions 18, 20 and along one side edge 18a of the first mounting portion 18. The third mounting portion 24 has generally planar inner and outer surfaces 70, 72 and at least one mounting hole 74 for connecting with a third member (not shown) extending between the surfaces 60, 62, the hole 74 having a central axis 75. Further, the fitting 12 also includes another or second joint portion 26 integrally connecting the third mounting portion 24 to the first mounting portion 20, the third portion 24 having an end 24a integrally formed with an end 20a of the second mounting portion 20. The second joint portion 26 has a load section 76 defined between a concave surface section 77 extending between the inner surfaces 28, 70 of the first and third mounting portions 18, 24, respectively, and a convex surface section 78 extending between the outer surfaces 30, 72 of the first and third mounting portions 18, 24. The joint concave surface section 77 has a third, radius of curvature $R_3$ (FIG. 3), preferably equal to the radius $R_1$ of the first joint load section 40, and is generally centered about the central axis 75 of third portion mounting hole 74 so as to define a fourth radius $R_4$ (FIG. 4), which is preferably equal to $R_2$.

With the above structure, a washer 80, preferably formed and sized substantially the same as washers 14, is disposable on the third mounting portion inner surface 70 so as to be generally centered about the central axis 75 of the third portion mounting hole 75. As with the washers 14, the washer(s) 80 each having opposing first and second, generally planar faces 80, 82 and a partially spherical outer circumferential surface 84, as best shown in FIG. 2. The spherical circumferential surface 84 has a radius $R_{W2}$ about equal to the third radius $R_3$ of the joint portion concave surface 77 and the washer 80 has an outside diameter $D_{W2}$ of about twice the fourth radius $R_4$ of the joint concave surface section 77. As such, each washer 80 exerts force (not indicated) generally against the joint portion load section 76 when the washer 80 is clamped to the third mounting portion 24 in the same manner as washer(s) 14 exerts force $F_W$ on the load section 40 of the first joint portion 22 discussed in detail above. Furthermore, the circumferential ends 76a, 76b of each joint load section 76 are preferably connected with the first mounting portion 18 by transition sections 86 of the second joint portion 26, which are preferably formed as the transition sections 60 of the first joint portion 22 described in detail above.

Preferably, as discussed above, the second joint portion 26 and the washers 80 are substantially identically sized as the first joint portion 22 and washers 14, such that washers 14 and 80 may be used with either the second or third mounting portions 20, 24. However, the fitting 14 may be constructed for certain applications with the joint portion 26 and the washers 80 being formed dimensionally greater or lesser than the corresponding dimensions of the first joint portion 24 and washers 14.

Furthermore, although not depicted, the fitting 12 may be formed with a fourth mounting portion integrally formed with the side edge 18b of the first mounting portion 18.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. An assembly for connecting at least first and second members, each member having a surface extending generally angled with respect to a surface of the other member, the assembly for connecting comprising:
   an L-shaped fitting including a first mounting portion having planar inner and outer surfaces and at least one mounting hole extending between the inner and outer surfaces for connecting with the first member, a second mounting portion extending angled with respect to the first mounting portion and having inner and outer planar surfaces and at least one mounting hole extending between the inner and outer surfaces for connecting with the second member, the second portion mounting hole having a central axis, and a joint portion integrally connecting the first and second mounting portions, the joint portion having at least one load section defined between a concave surface section extending between the inner surfaces of the first and second mounting portions and a convex surface section extending between the outer surfaces of the first and second mounting portions, the load section concave surface section having a radius of curvature; and
   at least one washer disposable on the second mounting portion inner surface so as to be centered about the central axis of the second portion mounting hole, the washer having opposing first and second, planar faces and an outer perimeter surface having at least a section with a partially spherical profile, the partially spherical surface section having a radius about equal to the radius of curvature of the joint portion concave surface section and the washer being sized such that the washer spherical surface section is disposed against the joint load section concave surface section so that the washer exerts force against the joint portion load section when the washer is clamped to the second mounting portion.

2. The connector assembly as recited in claim 1 wherein the fitting is formed of a composite material including fibers embedded in resin and the washer exerts force against the joint portion load section to compress resin in the load section when at least one of tensile force and torque is applied to the fitting first mounting portion.

3. The connector assembly as recited in claim 1 wherein one of:

the joint load section concave surface section extends partially circumferentially about and is centered on the central axis of the at least one second portion mounting hole so as to define a second radius and the washer is circular with the entire outer circumferential surface being partially spherical and has an outside diameter of about twice the second radius of the joint load section concave surface; and the joint load section concave surface section is spaced from and extends linearly adjacent to the at least one second portion mounting hole and the washer is polygonal, has at least one side with a partially spherical profile and is sized such that the at least one side with a partially spherical profile is disposed against the load section concave surface section when the washer is clamped to the second mounting portion.

4. The connector assembly as recited in claim 1 wherein the at least one washer has a central hole aligned with the second portion mounting hole and the assembly further comprises at least one fastener extending through the aligned washer and mounting holes and connectable with one of the members so as to clamp the washer against the second mounting portion inner surface.

5. The connector assembly as recited in claim 1 wherein the joint load section has opposing circumferential ends spaced from the first mounting portion and the joint portion further includes at least two curved transition sections connecting each load section circumferential end with the first mounting portion and being defined between a convex surface section extending between the inner surfaces of the first and second mounting portions and a concave surface section extending between the outer surfaces of the first and second mounting portions.

6. The connector assembly as recited in claim 5 wherein the second mounting portion has at least two mounting holes and the joint portion has at least two load sections each extending partially about the central axis of a separate one of the mounting holes and at least three transition sections each disposed at separate circumferential end of the at least two load sections and one transition section being disposed between the at least two mounting holes and connecting the circumferential ends of two load sections with the first mounting portion.

7. The connector assembly as recited in claim 1 wherein the joint load section extends at least ninety degrees about the second mounting hole central axis.

8. The connector assembly as recited in claim 1 wherein the fitting further includes a third mounting portion extending angled with respect to each of the first and second mounting portions and having at least one mounting hole for connecting with a third member.

9. The connector assembly as recited in claim 8 wherein:
the fitting further includes another joint portion for integrally connecting the third mounting portion to the first mounting portion, the third joint portion having a load section defined between a concave surface section extending between the inner surfaces of the first and third mounting portions and a convex surface section extending between the outer surfaces of the first and third mounting portions, the joint concave surface section having a third, radius of curvature and being centered about the central axis of second portion mounting hole so as to define a fourth radius; and at least one circular washer disposable on the third second mounting portion inner surface so as to be centered about the central axis of the second portion mounting hole, the washer having opposing first and second, planar faces and a partially spherical outer circumferential surface, the spherical circumferential surface having a radius about equal to the third radius of the joint portion concave surface and the washer having an outside diameter of about twice the fourth radius of the joint concave surface section such that the washer exerts force against the joint portion load section when the washer is clamped to the third mounting portion.

10. The connector assembly as recited in claim 1 wherein the at least one mounting hole of the first mounting portion has a central axis, the central axis the first portion mounting hole extending angled to the central axis of the second portion mounting hole.

11. The connector assembly as recited in claim 1 wherein the first mounting portion has a plurality of mounting holes and the second mounting portion has a plurality of mounting holes.

* * * * *